Sept. 1, 1970   E. DEGER ET AL   3,526,836
STATISTICAL METHOD, UNDER COMPUTER CONTROL, FOR THE
MANUFACTURE AND TEST OF MASS PRODUCED ARTICLES
Filed Jan. 23, 1968   3 Sheets-Sheet 3

INVENTORS
Erturk Deger
John B. Schultz
BY
ATTORNEY

![United States Patent Office logo]

3,526,836
Patented Sept. 1, 1970

---

3,526,836
STATISTICAL METHOD, UNDER COMPUTER CONTROL, FOR THE MANUFACTURE AND TEST OF MASS PRODUCED ARTICLES
Erturk Deger, West Lafayette, and John B. Schultz, Indianapolis, Ind., assignors to RCA Corporation, a corporation of Delaware
Filed Jan. 23, 1968, Ser. No. 699,967
Int. Cl. G01r 31/02
U.S. Cl. 324—158                        6 Claims

ABSTRACT OF THE DISCLOSURE

Samples of lots of the different components needed for the manufacture of mass produced articles are tested to determine the values and their statistical distribution of parameters of interest of each such lot. This information is employed to calculate the distribution of the values of parameters of products expected to be made from these components, and the test limits to be employed in checking these parameters. If the calculated parameters indicate that a relatively low percentage of the products will meet acceptable performance criteria, one or more of the lots of components must be replaced and in this case the calculations based on the statistical information are used to indicate which lot or lots to replace and which parameters of the replaced lots are unacceptable.

BACKGROUND OF THE INVENTION

The manufacture of mass produced articles involves, among other things, the design of the article, the procurement of material, the production of the article and the control of the quality of the article. In any factory of reasonable size, these functions—design, procurement, manufacture and quality control, are carried out by separate departments which do not always have common interests. For example, in times of great demand for a product, those charged with production may relax efficiency standards in the interest of obtaining a higher level of production. Conversely, quality control personnel sometimes call for a level of quality control which is neither required nor economic for a particular product. As a third example, those charged with the design of a product may, based on the belief that a low level of skill is available in the factory, call for relatively expensive parts to be assembled, whereas cheaper components—those with looser tolerances, could be used instead. In brief, because there is sometimes a lack of reliable information on which to base sound production decisions and because the different departments charged with the responsibility for manufacture may have interests which do not coincide, the finished product often is not optimal in the sense that it is not, for example, the least expensive way of making the product without adversely affecting its quality or performance.

The object of this invention is to provide a method and system for making mass produced articles which eliminates most of the disadvantages discussed above and which permits a product of a given level of quality to be produced at a substantially lower cost than was possible heretofore.

SUMMARY OF THE INVENTION

According to one feature of the invention, based on the statistical properties of parameters of the lots of parts tentatively selected for the manufacture of mass produced articles, a determination is made as to whether or not the lots are suitable for such use. If not, a sufficient number of the lots are replaced to insure that the articles will be acceptable in sufficient numbers to permit proceeding with the manufacture. According to another feature of the invention, at the same time that the statistical properties of the parameters of the lots of parts are measured, the performance expected of the articles is determined and based on these performance parameters, the test limits to be employed in checking the articles are determined and subsequently made use of in making such tests.

DETAILED DESCRIPTION

At the present time, when specifying a part to be used in the manufacture of a mass produced article, the design engineer indicates the values of given parameters of that part and the maximum acceptable derivation from these values. For example, a resistor may be required to have a value of 100 ohms±5%. This manner of specifying components is not employed in the present invention. Instead, the parameters are required to have a certain type of distribution as, for example, Gaussian, uniform, triangular or other distribution, a certain range within which the central tendency of this distribution must lie, and other statistical properties. This is believed to be a more realistic and natural way of describing the parts and it also makes possible certain calculations and predictions discussed in detail shortly.

In the discussion which follows, first the invention is discussed in general terms. Later, specific examples are given to illustrate how these principles are applicable to the manufacture of a specific article.

Figure 1:
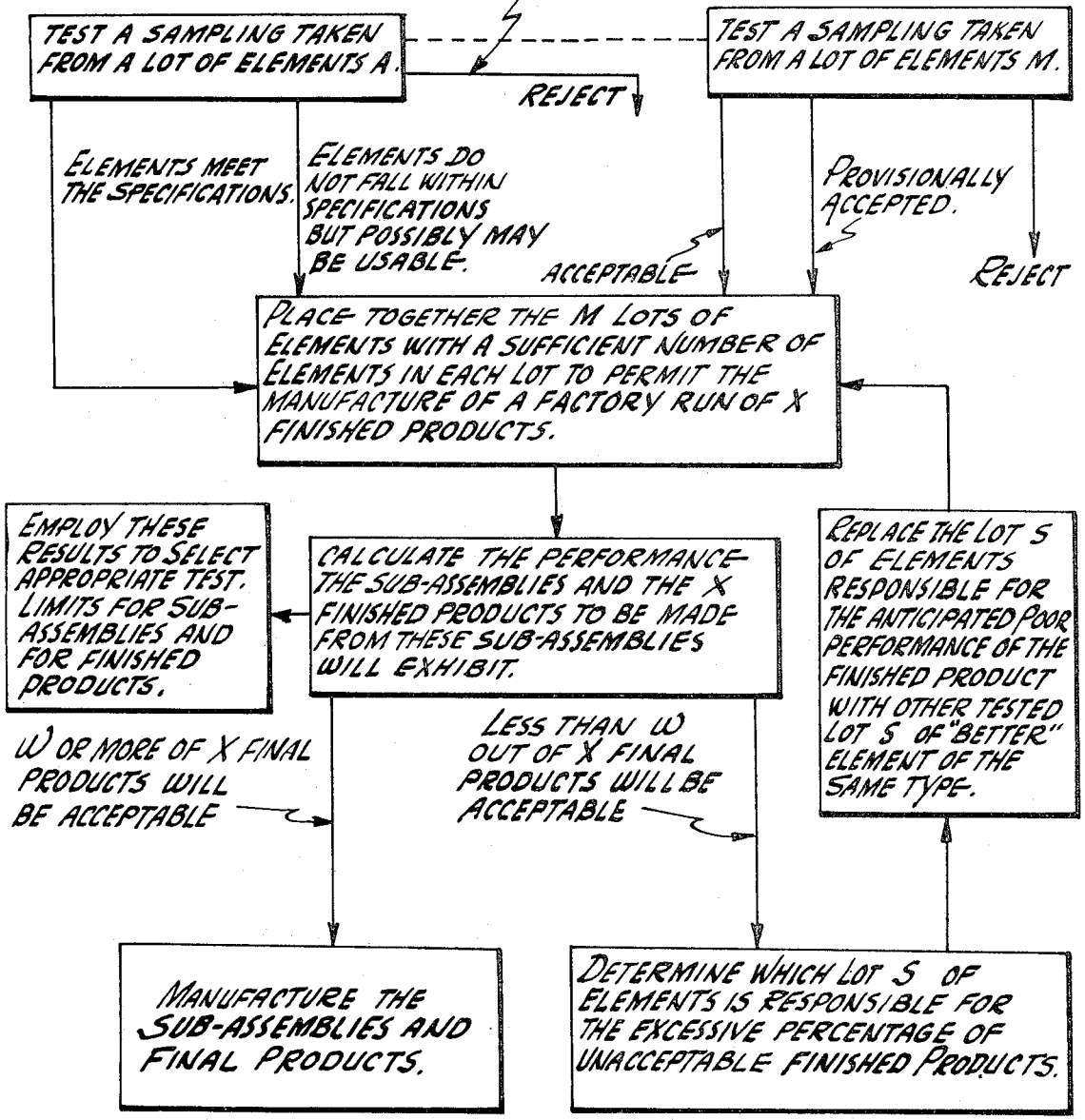
FIG. 1 is a flow chart illustrating some of the steps in the manufacturing method of the invention.

The flow chart of FIG. 1 shows some of the steps in the process, according to the invention, of manufacturing mass produced articles. Such an article may be made up of some number $m$ of different elements where element A may consist of a transformer, element B of an integrated circuit package, and so on. These elements may be supplied by different component manufacturers and arrive at some central point in the factory.

In the manufacturing process of the present invention, each lot of elements is tested, preferably by a sequential sampling technique, which in itself is well-known. (See, for example, A. Wald, "Sequential Analysis," Wiley Publications.) This involves randomly selecting a sample, that is, a number of elements, from a lot of perhaps 500 to 1000 elements, and measuring the parameters of interest of these elements (some specific examples of such tests are given later). The size of the sample, that is, the number of the elements which must be tested to determine the characteristics of interest of the entire lot from which the sample was chosen, is not fixed but will depend upon the "condition" such as the amount of non-uniformity, of the elements of the lot. However, in general, the sequential sampling technique involves the use of samples of relatively small size.

The measurements above are made automatically by a computer-controlled testing system which, in and of itself, is known. One such system, described in the context of testing a somewhat sophisticated article, namely a color kinescope, is described in copending application, Ser. No. 653,083, "Digital Computer Controlled Test System," filed July 13, 1967 by Walter Endres Bahls, et al. and assigned to the assignee of the present application.

Hopefully, the elements tested are within specifications and, if so, they are selected for the manufacture of finished products. As a second alternative, the lot of elements may not fall within specifications but may possibly still be usable for the manufacture of finished products when combined with the other lots of elements. If so, this lot is provisionally accepted for use. As a third alternative, the elements may be so far out of specification, that they are not usable. In this case, the sampling technique employed will indicate that the entire lot of elements should be rejected, either to be returned to the supplier or to be tested in their entirety so that only those elements in the lot which fall within specifications may be retained and the others discarded.

In the system of the present invention, a lot of elements may be rejected for any one of a number of reasons. For example, if a sample of elements being tested indicates there is an excessive population in the lot which have values of a measured parameter greater than the value of that parameter at $4s$, where $s$ is the "standard deviation" for that parameter, that lot is rejected. The expression, "standard deviation" (sometimes also indicated by the Greek letter sigma), refers to the amount of "scatter" or "dispersion" or, thought of another way, the degree of "concentration" of the measurements made of a given parameter. A lot may be rejected also if the "mean value" or "central tendency" $\mu$ of a measured parameter differs from the $\mu$ called for in the specifications by greater than a given amount. The terms $\mu$ and $s$ and others mentioned later are defined more precisely by means of simple equations in any standard text on statistics as, for example, S. S. Wilkes, "Elementary Statistical Analysis," Princeton University Press, 1951.

A lot of elements may be conditionally acceptable if, for example, it has an excessive population with values of a measured parameter between the measured values of that parameter at the $3s$ and $4s$ points and/or if its "measured" central tendency $\mu_m$ is as indicated in the following expression:

$$(\mu_s - s_s) < \mu_m < (\mu_s + s_s) \quad (1)$$

where $\mu_s$ is the specified tendency and $s_s$ is the specified standard deviation. The term "measured" above is placed in quotes because what is actually measured is a voltage, current or the like, indicative of a parameter and it is from a group of such measurements that a quantity such as $\mu_m$ or $s_m$ is calculated.

As already mentioned, samples of the elements in all lots A . . . M are tested. Those lots of elements which the tests indicate are fully acceptable and those lots of elements which the tests indicate are provisionally acceptable are then placed together in a storage area. In one practical situation to be discussed shortly, a sufficient number of elements in each lot is stored to permit the manufacture of 500 finished products. This may represent the number of products to be made in one eight-hour factory shift.

The tests made of the lots of elements A . . . M indicate not only whether these lots meet specifications or provisionally meet specifications, but also the actual parameter distribution characteristics of the elements of each lot. For example, a lot of resistors which have a nominal resistance of 100 ohms may be found to have a normal, that is, a Gaussian distribution with a central tendency of 98 ohms and with 65% of the resistors having a value between 97 and 99 ohms. This information is calculated by the same digital computer which controls the operation of the test stations which measure the resistance or other parameters of interest. From this information, the computer also calculates the performance which will be exhibited both by the subassemblies made from the elements and by the finished products made from these subassemblies.

Of course, the performance of the finished products should meet a marketing standard initially stipulated for the product. For example, in the case of a radio receiver, it should have a certain gain, a certain selectivity, a certain freedom from noise and so on. However, the tests of the lots of components may indicate that the finished products will have parameter values which differ from the marketing standards in a sense such that the finished products will be better than those originally called for. These values are made use of in testing the finished products to determine not only whether they are marketable but also whether the manufacturing process is operating in the manner it should. In other words, if a finished product such as a radio receiver fails to meet the standards predicted by the computer but is still acceptable for marketing, the failure to meet predicted standards may indicate that something is amiss in the manufacturing process. This information enables the process to be corrected before it deteriorates sufficiently to make the product unacceptable.

The computer indicates, with great precision, what percentage of the finished products is expected to meet the marketing standards. For example, in a factory run of 500 receivers, the computer may indicate that 492 of the receivers will be marketable and eight of the receivers not marketable and therefore not acceptable. Calculations have been made to indicate what percentage of final products have to be good to make the manufacturing process a profitable one. If this percentage is met, then the lots of elements selected are used to manufacture the subassemblies and final products.

The calculations performed by the computer may indicate that less than the desired number of final products will be acceptable, if the lots of elements initially placed together are employed in the manufacture of the finished product. The digital computer is programmed to calculate not only this information but also the actual performance characteristics to be expected of those finished products which will be unacceptable. The computer is also programmed to compare the operating parameters calculated for the finished products with those desired for the finished products and to indicate the components responsible for the unacceptable performance.

It should be recalled at this point that some of the elements accepted initially were accepted only provisionally and it generally will turn out that the unacceptable performance of the finished product is due to this group of elements. When the printer or other visual indicating device associated with the computer indicates the elements which are inadequate, they are replaced with a second group of elements of the same type. This second group of elements is tested in exactly the same way as the first group was tested and if they are acceptable or provisionally acceptable, they are placed together with the remaining group of elements. Thereafter, the same procedure as above is repeated.

It should be mentioned here, that at this point, not only is it known which elements are "poor" but also what characteristics of these elements must be improved. It may be found, in practice, that it is sometimes more economical to place more rigid specifications on a relatively nonexpensive element and relax the requirements for a more expensive element and still produce a product which is better than and less expensive than the product made according to the original design. For example, in the manufacture of a radio receiver, it may be that a conditionally accepted lot of ganged capacitors which cost $1.50 per unit is causing too many rejects to occur. This lot, in some cases, may be retained and a "good" lot of resistors costing one cent per unit replaced by a better lot of resistors, perhaps at a slight increase in price per resistor, to reduce the number of rejects to an acceptable level, and considerable money saved in the process.

In accordance with the manufacturing technique of the present invention, at the time the performance of the subassemblies and the final assemblies is calculated, appropriate limits for the programs of tests for the subassemblies and final assemblies are automatically calculated. These programs of tests are subsequentially employed in the test stations for checking the performance of the subassemblies, and final assemblies, as is discussed shortly.

Figure 2:
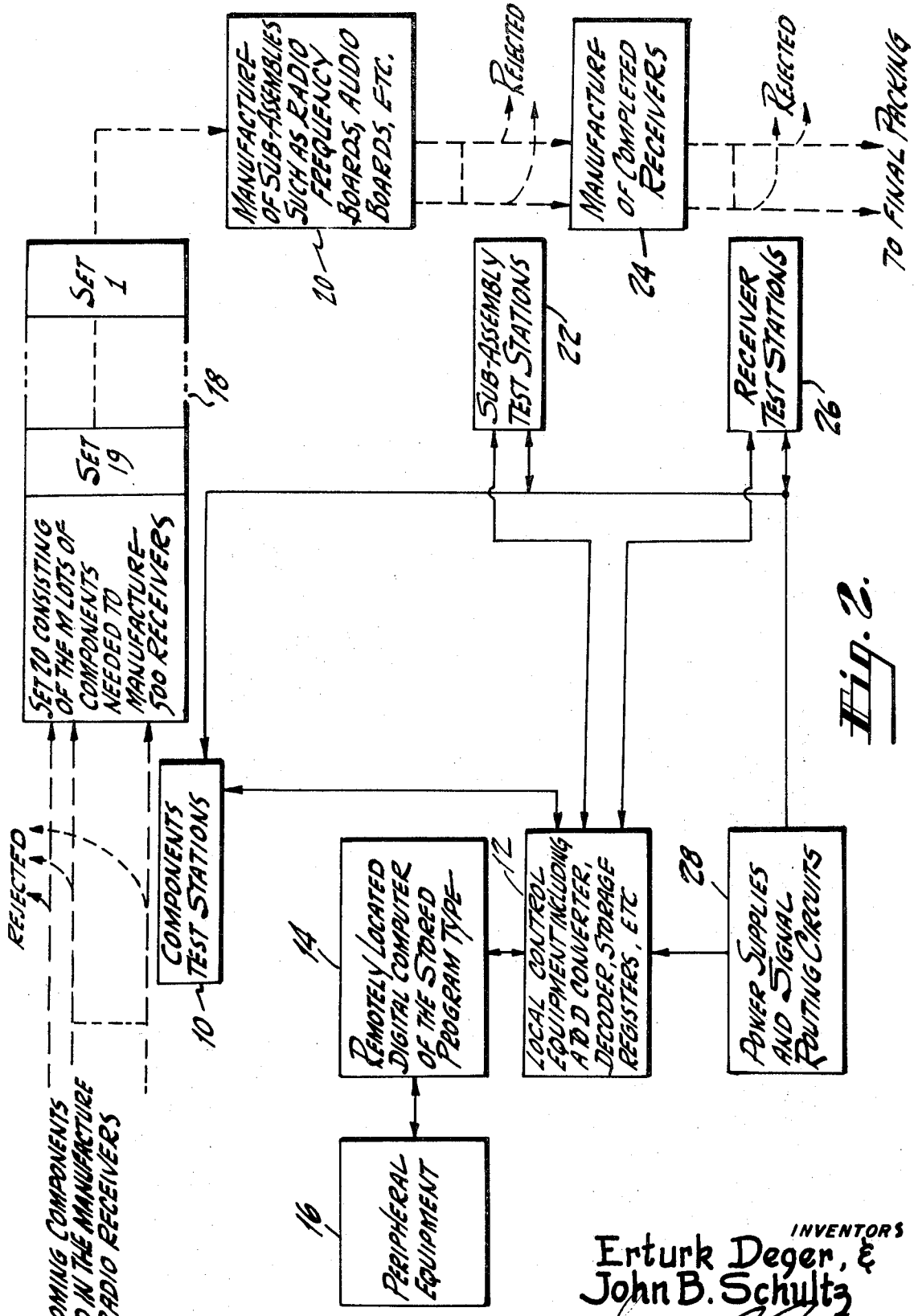
FIG. 2 is a block diagram of the system of the invention.

Major portions of the system of the present invention are shown in FIG. 2. The dashed lines indicate the paths along which materials flow. The solid lines indicate electrical interconnections and each single line represents a multiple conductor cable.

The many components used in the manufacture of a mass produced product arrive at the region indicated at the upper left of the FIG. 2. The first step in the manufacturing process is to test the components and this involves determining the statistical distribution with respect to certain performance criteria of various parameters of the incoming parts and keeping a record of this information. The testing is performed at components test stations 10.

An operator may select a random sample of incoming components and place this sample in a special testing board. To give a simple example first, in the case of resistors, perhaps 40 or 50 resistors may be chosen from a lot of 500 to several thousand resistors and these selected resistors placed between a corresponding number of sets of terminals on the board. The board also may include a means for identifying the circuit elements to be tested, as for example, a set of contacts which will indicate to the test station that: the items it is to test are resistors which have a certain nominal or mean value ($\mu$) such as 100 ohms, a certain standard deviation $s$ such as 2 ohms, with a known distribution such as Gaussian.

After boards such as the above are assembled, they are plugged into one of the test stations within block 10. The test station is operated under the control of the local control equipment 12 which is located in the factory environment and the local control equipment, in turn, is controlled by a digital computer 14 of the stored program type. The digital computer, which may be an RCA Spectra 70-45 or other commercially available machine, is normally located in an air-conditioned room and it may be several hundred feet away from the factory floor and the local control equipment.

The operation of a test system of this type is quite analogous to that of the computer controlled color test system described in the copending application. In brief, in response to the component identification data supplied to the digital computer 14 through the local control equipment 12, the computer selects from its memory a program of tests suitable for these particular components. The program may already be in the main memory of the computer 14 or it may be stored in a piece of peripheral equipment such as a disc file which is located within block 16. If the program is stored in a disc file, it is rapidly transferred to the main memory of the computer and the computer then causes the local control equipment to make the test station perform the tests which are required. For example, the local control equipment may cause the test station to apply a predetermined current, in succession, to the resistors being tested and each time a current is applied to a resistor, a measuring circuit at the test station may measure the voltage appearing across that resistor. The successive voltages thereby obtained are applied to an analog-to-digital converter in the local control equipment 12 and translated there to successive binary words.

When employing the sequential sampling technique, after each measurement of an element, such as a resistor, is made, the computer performs calculations on the binary word ($s$) indicative of that measurement and of measurements of previous elements of the same sample. One of these calculations involves a statistical determination of when a sufficient number of elements in that sample have been tested to provide a reliable estimation of the characteristics of interest of the entire lot of elements from which the sample was chosen. If the sample size is tentatively chosen to be 50 elements, as an example, it may very well be that the computer will decide that a reliable estimate has been made after only 15 of these elements or less have been tested. In this case, it so signals the operator and does not test the remaining elements of the sample. On the other hand, it occasionally occurs that the 50 elements of the sample may not provide the desired data with sufficient certainty. In this case, a signal is applied back to the test station to indicate to the operator that another sample (another group of elements) must be chosen from the same lot and tested. The tests and calculations occur very rapidly—within a fraction of a second.

When the computer 14 is satisfied that the tests made have provided sufficient data for an accurate determination of the characteristics (standard deviation, type of distribution curve, its central tendency, its skew, and so on) of all elements in the lot from which the sample was chosen, it so indicates at a printer or the like located at the test station within block 10 which is testing that sample, so that the operator may proceed to the next lot of parts. It also indicates whether the entire lot is acceptable, or whether it must be rejected. The calculations necessary to obtain the values of the various statistical quantities are in themselves straightforward (again see any text on statistics), and readily are programmed on any general purpose machine as, for example, the RCA Spectra 70-45. The decision rules for determining whether a lot is acceptable or not involves comparisons of calculated data with data relating to $\mu$, $s$ and so on stored in the computer memory and also readily are programmable.

There may be up to several hundred or more components employed in the manufacture of a relatively complex article. Each lot of components is tested by sequential sampling techniques in the manner described above and, when the testing is completed, the accepted or provisionally accepted lots of components are grouped together and tentatively placed in a storage area. The storage area is shown at 18 in FIG. 2. It may contain a sufficient number of sets of lots of components for from one to, say, twenty factory runs, that is, from one to twenty or so eight-hour shifts of production. The number of sets of components will depend upon economic factors such as the cost of inventory, the cost of storing the parts, the possibility of running short and losing production time and so on. In the manufacture of a complex article such as a radio receiver, only a small number of sets of lots, such as three, need be present at any particular time, provided there is a sufficient back-up of untested components. For other articles, a larger number of sets of lots may be preferable. For purposes of illustration, twenty sets are shown in FIG. 2.

The last set of lots of components tested is legended "set 20" in FIG. 2 and it consists of the $m$ groups of components needed to manufacture 500 products such as receivers. This set 20 is a group of interrelated components which will move together through the production system. Similarly, the set 19 which was previously tested and stored is a group of interrelated elements, and so on.

The selection of components just described is a tentative selection. At the time the various components are placed together, the digital computer 14 has stored in its memory data relating to the values of various parameters of the components and their distribution. This computer also has stored in its memory, a program of calculations to be performed on this data which will determine a number of different things. First, it will determine what percentage of the completed receivers will fall within specifications and what percentage will not. Hopefully, a sufficient number of the components will fall within specifications that it will be economical to go ahead with the manufacture of the receivers from that set of lots 20 just selected. However, if the results obtained by the computer indicate that too small a percentage of the finished receivers will be acceptable, this will mean excessive costs for reworking the unacceptable products and a corresponding excessively high cost of manufacturing.

The stored program in the computer will automatically indicate whether or not the set of lots 20, for example, is a satisfactory set. If the set is satisfactory, it is "bonded," that is, it is certified to be suitable for manufacture and no components are thereafter either added to or removed from the set until manufacturing starts. If the set of lots is unsatisfactory, the computer determines from the test data it has accumulated, why there will be an unusually high percentage of unacceptable finished products.

It should be mentioned that the determination of whether or not an acceptable distribution of final products will result from a particular set of lots is made immediately after a complete set of lots has been measured. No measurements of another set of lots are made before this determination is completed. For example, measurements of the set of lots 20 will not begin until set of lots 19 has been "bonded."

At the time the analysis is made in the present system, as contrasted to what is done in the system of the copending application, the final products have not been made but instead the values of parameters which the final products would have, if the manufacturing were allowed to proceed, are calculated. To give a simple example, prior to the time manufacturing starts, the computer 14 may indicate that a lot of resistors which was accepted for set 20 but which perhaps did not quite meet the specifications originally set forth for those resistors should be replaced with resistors of higher mean value. As a second example, the computer may indicate that the intermediate frequency transformers have insufficiently broad band-passes, and so on. In any such case, before manufacturing starts, the lot of components within a set indicated to be inadequate is removed and replaced with another lot of components which, hopefully, is compatible with the remaining components. This substituted lot of components is tested at 10 in the same manner as already described and the computer 14 then makes another set of calculations to determine whether a sufficiently high percentage of the final products is acceptable.

After determining that a set of lots may be bonded, the computer 14 also determines what the performance of the audio "boards" (each such board includes a number of stages of audio amplification), the radio frequency boards (each such board includes, for example, several radio-frequency stages and the local oscillator), and other subassemblies should be and also what the performance of the complete receiver should be and it also determines the limits to be employed in the programs of tests which measure these performance parameters. These calculations, like the ones just described, are based on the statistical distribution data stored in the computer. After the test limits for a particular set of lots such as set 20 are determined, this information is stored in one of the peripheral equipments as, for example, on a magnetic disc or a drum, or a magnetic tape. When, at some later time, a particular set of lots of components is manufactured into subassemblies and the subassemblies made into the finished receivers, this program is called-up by the computer 14 and employed to direct the operation of the various test stations.

For most of the tests, changing the test limits involves employing the same values of stimuli but sensing for different values of signals indicative of the parameters being measured. For example, in testing one lot of resistors, a current of one milliampere may be employed and the measuring amplifiers set to sense a voltage of one volt±.05 volt. For another lot of resistors, the same value of stimulus (current, in this case) may be employed but the measuring equipment set to sense a voltage of 0.95 volt±.05 volt.

There are some tests, however, analogous to some of the tests described in the copending application in which a predetermined value of sensed signal must be obtained. Here, in order to obtain this value of sensed signal, the stimulus is changed in accordance with a predetermined program until the desired value of sense signal is produced.

At the beginning of a factory shift, a bonded set of components is removed from the storage area 18 and is then manufactured into the finished receivers. The manufacture is illustrated to occur in several different steps. First, subassemblies are manufactured and this occurs in the area indicated by block 20. Each subassembly is tested at the subassembly test stations 22. Preferably, only the transfer characteristic of the subassembly need be measured. In other words, each subassembly is treated as a black box and the test station applies a certain set of inputs to this box and measures the corresponding outputs produced by the box. The values of the inputs are determined by the program and, as already mentioned, they may, in some cases, be different for the subassemblies made from the different sets of lots. Correspondingly, the distribution of outputs expected in response to the "stimuli" applied to the various subassemblies will, in many cases, be different for the different sets of lots.

The signals sensed by the test stations 22 which are indicative of the parameters being tested, are converted to binary information and compared with stored binary information in the manner already discussed in connection with test station 10. A determination is then made by the computer as to whether the subassembly being tested is acceptable or not. If a subassembly is not acceptable, means may be provided at the test station for so indicating to the operator. The printer associated with the computer or, as an alternative, a printer located right at the test station (within block 22) may be employed automatically to print out what has caused the subassembly to fail its tests. This print-out may be employed to assist in repairing the subassembly, if repair is possible.

After the testing of the subassemblies is completed, those which are acceptable are assembled into complete receivers at 24. The complete receivers are subsequentially tested at test stations 26 which, like the other test stations, are also under the control of the digital computer 14. Again, as in the case of the subassembly test stations 22, the receiver test stations will either accept or reject the finished receiver and, if rejected, will indicate the component or subassembly of the receiver which is not operating properly.

In the computer-aided manufacturing system of FIG. 2, there may be separate power supplies for each test station or there may be a common power supply which is time-shared among the test stations. Both types of power supplies are described in the copending application. For purposes of illustration, a time-shared power supply is shown at 28 in FIG. 2. This block also includes the routing circuits as discussed in the copending application.

Figure 3:
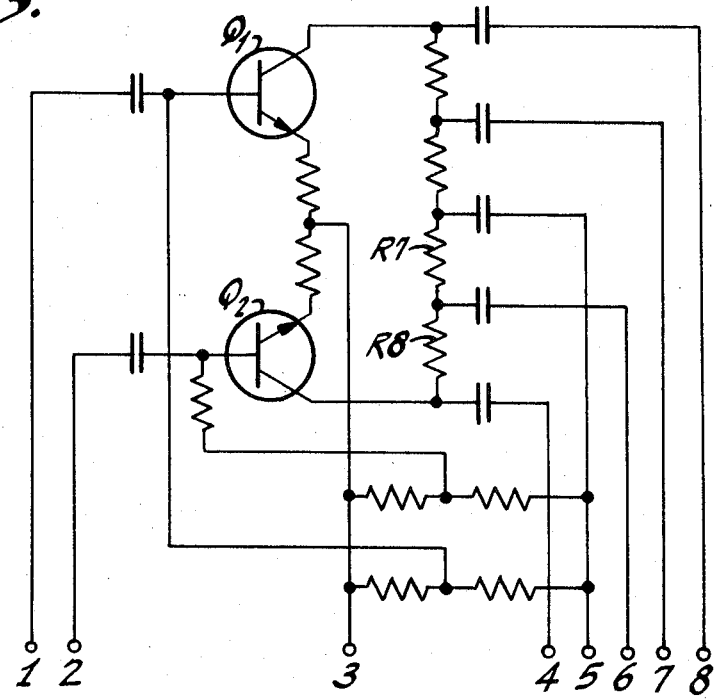
FIG. 3 is a schematic diagram of a component—a one-stage stereo amplifier, of a mass produced article.

In the foregoing description of the operation of the system of the invention, for the sake of simplicity, the testing of a lumped circuit element such as a resistor is discussed. These days, this illustration may be somewhat too simple. Instead of elementary circuit elements such as resistors, capacitors and the like, "modules" consisting of many different elements, some active, some passive, are often used to make an article such as a radio receiver or other circuit. One such module is illustrated in FIG. 3. It is a one-stage stereo amplifier consisting of the circuit elements shown, laid down on a ceramic substrate and having the appearance of a small block or package with eight leads. This package is tested for various parameters in the same general way as described for the resistor, however, the tests are considerably more sophisticated. Some of these are discussed below by way of example.

Figure 4:
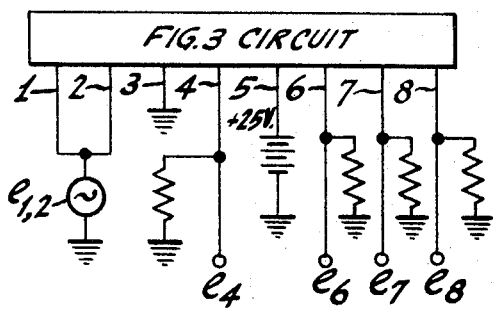
FIGS. 4 and 5 illustrate the stimuli applied and voltages sensed during certain tests of the module of FIG. 3.

FIG. 4 illustrates the test made at the component test station, under program control, for low frequency gain of the module of FIG. 3. At this test station, a 70 Hertz, 0.1 volt, alternating voltage source $e_{1,2}$ is connected at one terminal to leads 1 and 2 and at its other terminal to ground. Lead 3 is connected directly to ground. A +25 volt direct voltage source, shown as a battery, is connected to lead 5 and others of the leads are connected through resistors to ground, as shown.

The component test station measures the output voltages at leads 4, 6, 7 and 8, that is, the output voltages $e_4$, $e_6$, $e_7$ and $e_8$, respectively. As soon as these measurements are completed for a component, the computer performs a number of calculations. First, it determines the ratios $e_4/e_{1,2}$, $e_6/e_{1,2}$, $e_7/e_{1,2}$ and $e_8/e_{1,2}$. These numbers may be termed "random variables" and are indicative of four different gain parameters of interest. For example, $e_4/e_{1,2}$ is a measure of low-frequency voltage gain of the transistor $Q_2$; $e_6/e_{1,2}$ is a measure of the same parameter but it also is a measure of the relative values of resistors $R_7$ and $R_8$, and so on.

From the calculations above, the computer then calculates the mean value $\mu$ of the four random variables. It does this by adding the successive random variables and dividing by the number of measurements which are made. For example, if measurements are made of 25 modules of FIG. 3 and therefore 25 measurements of $e_4$, and 25 calculations have been made of the random variable $e_4/e_{1,2}$, these 25 values of $e_4/e_{1,2}$ are added and divided by 25 by the computer, under program control, to obtain the mean value $\mu$ of this variable.

After the mean values have been determined for the various random variables, the computer, under program control, calculates the standard deviations for these variables. The equation for the standard deviation is:

$$s = \left( \frac{(x_1-\mu)^2 + (x_2-\mu)^2 \ldots (x_n-\mu)^2}{n-1} \right)^{1/2} \quad (2)$$

where $x_1$ is the value of this random variable for the first sample, $x_2$ for the second sample ... $x_n$ for the $n^{th}$ sample and $n$ equals the number of samples.

After the calculations above have been completed, the computer compares the numbers it has calculated with numbers stored in its memory. For example, for the module of FIG. 3, the computer has stored in its memory the following specified values for $\mu$ and $s$.

TABLE I

| Random variable | $\mu$ | $s$ |
| --- | --- | --- |
| e 4/e 1,2 | 4.22 | 0.117 |
| e 6/e 1,2 | 0.759 | 0.0212 |
| e 7/e 1,2 | 0.759 | 0.0212 |
| e 8/e 1,2 | 4.22 | 0.117 |

The comparisons made by the computer will indicate whether the lot of circuit modules being sampled has a low-frequency gain which is acceptable or which is provisionally acceptable or which is not acceptable. Some of the rules for this decision are given above and are illustrated below in the discussion of FIG. 6.

The computer does not directly calculate the shapes of the distribution curves for the random variables discussed above. (In the particular example being discussed, the desired shape is a normal distribution.) However, the calculations made to determine the deviation $s$, in an indirect way, indicate whether the distribution of parameter values is or is not that called for by the specifications.

The high frequency gain of the module of FIG. 3 is tested in a manner similar to that shown in FIG. 4. All of the connections are the same, however, the voltage $e_{1,2}$ is 0.1 volt at 10,000 Hertz rather than at 70 Hertz. Similarly, the specified values of $\mu$ and $s$ are slightly different than those given in the table above.

Figure 5:
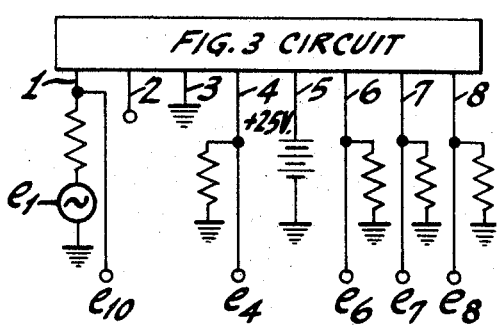

FIG. 5 illustrates the tests made of the module of FIG. 3 to determine the gain, the separation, and the input impedance of the upper channel (the one with transistor $Q_1$) of the FIG. 3 circuit. Here, the stimulus $e_1$ is applied only to lead 1 and has a value of 0.1 volt at 1,000 Hertz. The component test station measures the voltages $e_4$, $e_8$ and $e_{10}$ and then calculates the random variables $e_{10}/e_1$, $e_8/e_{10}$ and $e_8/e_4$. For this particular circuit, the specified values for $\mu$ and $s$ for these random variables are:

TABLE II

| Random variable | $\mu$ | $s$ |
| --- | --- | --- |
| e 10/e 1 | 0.505 | 0.010 |
| e 8/e 10 | 4.44 | 0.110 |
| e 8/e 4 | ¹ 550 | |

¹ Minimum.

It may be observed from Table II above that in one case a minimum value of $\mu$ is specified. This value is simply an indication of the amount of separation which must be present between the two channels when one of the channels has an input and the other does not.

In addition to the various tests given above, the module of FIG. 3 is also tested for other parameters. For example, tests are made of direct-current leakage, gain, separation, and input impedance of the lower channel, clipping level, and noise level. As the tests discussed in detail above are sufficiently representative, these other tests are not illustrated separately.

After the random variables above have been measured and the various calculations carried out to determine the values of $\mu$, $s$ and so on for these random variables, the computer then determines whether the set of the lots into which the components have tentatively been placed may be bonded. This determination will be illustrated only for a single random variable, namely the gain of one channel of a stereo amplifier. However, it is to be understood that similar determinations are made for all random variables of interest.

Figure 6:
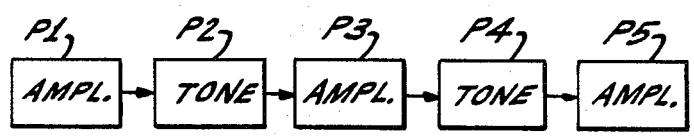
FIG. 6 is a block diagram of an amplifier.

The amplifier is illustrated in FIG. 6 and it is shown to consist of five components, P1 through P5. Three of the components are, themselves, amplifiers and two are tone control circuits. Each part P may, for example, be a circuit on a ceramic substrate, just like the circuit of FIG. 3. In this case, the FIG. 6 circuit may be considered to be a subassembly and this subassembly may be part of a larger system such as a radio receiver or the circuit may be considered to be a final product made from elementary components. As a third alternative, one or more of the blocks in FIG. 6 may, itself, be considered a subassembly which previously was fabricated by soldering together transistors and other circuit elements and the entire circuit of FIG. 6, a finished product in a separate chassis which is sold as a stereo amplifier. In any of these cases, the principles of manufacturing are the same.

The gain G of the channel of interest of the amplifier of FIG. 6 is given by the following equation:

$$G = A_1 A_2 A_3 A_4 A_5 \quad (3)$$

where $A_1$ = the voltage gain of stage P1,
$A_2$ = the voltage gain of stage P2, and so on. In Equation 3 above, $A_1, A_2 \ldots A_5$ may be considered random variables and, in the manner discussed above, these variables have distributions which can be measured and can be specified by $\mu$, the mean value of central tendency and $s$, the standard deviation, and also by the shape that the distribution curve takes. It already has been stated that for a lot of components to be accepted, the "measured" mean value $\mu_m$ for each component must satisfy the conditions given in the following equation:

$$(\mu_s - s_s) < \mu_m < (\mu_s + s_s) \quad (4)$$

In addition, the "measured" deviation $s_m$ for each component should be less than the specified deviation $s_s$, as shown in the following equation:

$$s_m < s_s \quad (5)$$

Table III below is a set of specifications for the amplifier illustrated in FIG. 6.

TABLE III

| Part | $\nu_s$ | $S_s$ | Shape |
|---|---|---|---|
| P1 | 5 | 0.15 | Normal. |
| P2 | 0.2 | 0.007 | Do. |
| P3 | 6 | 0.2 | Do. |
| P4 | 0.3 | 0.01 | Do. |
| P5 | 8 | 0.3 | Do. |

The so-called management limits mentioned previously are determined in the following way. Let $\mu_g$ equal the mean value of the gain of the five stages of the amplifier. This quantity $\mu_g$ can be calculated from the following equation which is derived from Equation 3:

$$\mu_g \cong \mu_1 \mu_2 \mu_3 \mu_4 \mu_5 \quad (6)$$

where $\mu_1$=the mean value of the gain of stage P1,
$\mu_2$=the mean value of the gain of stage P2, and so on.

From the theory of statistics, it is known that the standard deviation of a parameter of a system can be expressed in terms of the standard deviations of that parameter for the parts making up that system and partial derivatives of that parameter for the parts, in the following way:

$$s_g^2 \cong s_1^2 B_1^2 + s_2^2 B_2^2 + s_3^2 B_3^2 + s_4^2 B_4^2 + s_5^2 B_5^2 \quad (7)$$

where $s_g$=the standard deviation of the gain G of the manufactured amplifier,
$B_1 = \delta G/\delta A_1$, that is, the partial derivative of the gain G of the amplifier relative to the gain $A_1$ of the first stage P1,
$B_2 = \delta G/\delta A_2$
$B_3 = \delta G/\delta A_3$ and so on.

From Equation 3 and the specified mean values of gain $\mu_s$ given in Table III, the actual values of B can be determined in the following way:

$$B_1 = \delta G/\delta A_1 = A_2 A_3 A_4 A_5 = (0.2)(6)(0.3)(8) = 2.88 \quad (8)$$
$$B_2 = \delta G/\delta A_2 = A_1 A_3 A_4 A_5 = (5)(6)(0.3)(8) = 72 \quad (9)$$
$$B_3 = 2.4 \quad (10)$$
$$B_4 = 48 \quad (11)$$
$$B_5 = 1.8 \quad (12)$$

From Equations 7–12 and the values of $s_s$ given in Table III, the value of $s_g$ can be determined and it is found to be:

$$s_g = 1.091 \quad (13)$$

From Equation 6 and the values of $\mu$ given in Table III, the value of $\mu_g$ is found to be:

$$\mu_g = 14.4 \quad (14)$$

It has been determined that the upper and lower acceptable limits $L_L$ and $L_U$, respectively, for the gain should be:

$$L_U \cong \mu_s + 3s_g \cong 17.673 \quad (15)$$
$$L_L \cong \mu_s - 3s_g \cong 11.127 \quad (16)$$

These upper and lower limits are the so-called management limits. The factors taken into consideration in arriving at these limits are concerned with the variations expected in $\mu_m$ and other factors which need not be discussed here.

After a set of lots is measured, upper and lower limits for the different parameters of interest for that set of lots are calculated by the computer in the same way as discussed above, however, the measured values of $\mu$ and $s$ are used instead of the specified values. To bond a set of lots, the computer must find that the calculated upper limit for each random variable of interest is equal to or less than the management upper limit and the calculated lower limit for each such random variable is greater than or equal to the management lower limit.

The following numerical illustrations will serve to illustrate this. Suppose still that gain is the parameter of interest. Suppose also that the various voltages of interest have been measured and the following values of $\mu$ and $s$ calculated.

TABLE IV

| Stage | $\mu$ | $s$ |
|---|---|---|
| P1 | $\mu_1 = 5.12$ | $s_1 = 0.13$. |
| P2 | $\mu_2 = 0.203$ | $s_2 = 0.007$. |
| P3 | $\mu_3 = 5.8$ | $s_3 = 0.1$. |
| P4 | $\mu_4 = 0.3$ | $s_4 = 0.01$. |
| P5 | $\mu_5 = 8.1$ | $s_5 = 0.2$. |

From Equation 6, the mean value of the gain $\mu_g$ is found to be $\mu_g = 14.580$ and from Equations 7–12, the standard deviation $s_g$ for the gain is found to be equal to $s_g = 0.9075$. Therefore, the calculated upper limit for the gain is $L_U = 14.58 + 3(0.9075) = 17.302$ and the calculated lower limit is $L_L = 14.58 - 3(.9075) = 11.858$. In this instance, the calculated upper limit 17.302 is lower than management upper limit 17.673 and the calculated lower limit 11.858 is greater than the management lower limit 11.127. Therefore, with respect to the gain parameter, the set of lots may be bonded. Moreover, when testing the manufactured amplifier of FIG. 6 for this parameter, the test limits with which the measured limits will be compared, will include the calculated limits just specified as well as the management limits. If the finished product meets (is within) the management limits $L_U = 17.673$ and $L_L = 11.127$, it may be (but is not necessarily) accepted even if it is not within the narrower limits of 17.3 and 11.8 just calculated. It will be accepted if close to the narrower limits. It will not be accepted if the actual measurements of the manufactured amplifier indicate limits well outside of the calculated limits but within the management limits. In either case, the failure to fall within the narrower limits indicates that the manufacturing process is not operating in the way it should and that corrective action should be taken. And in the latter case, it may indicate a relatively serious failure in the manufacturing process which would not show up until the amplifier was shipped and this would mean later failures in the field, later repair costs, dissatisfied customers and so on.

As a second example, suppose in a set of lots of components, one part P3 is out of specifications but all other parts are well within specifications. This example is illustrated in Table V below.

TABLE V

| Stage | $\mu$ | $s$ |
|---|---|---|
| P1 | $\mu_1 = 5$ | $s_1 = 0.1$. |
| P2 | $\mu_2 = 0.2$ | $s_2 = 0.00313$. |
| P3 | $\mu_3 = 6$ | $s_3 = 0.3$ [1]. |
| P4 | $\mu_4 = 0.3$ | $s_4 = 0.01$. |
| P5 | $\mu_5 = 8$ | $s_5 = 0.1$. |

[1] =Out of specifications.

When the same type calculations as discussed above are performed by the computer, it will come up with the following results:

$$\mu_g = 14.4$$
$$s_g = .9895$$
$$L_U = 17.36$$
$$L_L = 11.44$$

These results meet all of the management requirements for the gain parameter and this set of components is acceptable for bonding in this respect.

In a third example, suppose one of the parts P3 is out of specifications just as in the last example above.

However, the other parts are barely within specifications. Now the situation is as shown in Table VI below.

TABLE VI

| Stage | $\mu$ | $s$ |
|---|---|---|
| P1 | $\mu_1=5$ | $s_1=0.15$. |
| P2 | $\mu_2=0.2$ | $s_2=0.007$. |
| P3 | $\mu_3=6$ | $s_3=0.3$ [1]. |
| P4 | $\mu_4=0.3$ | $s_4=0.01$. |
| P5 | $\mu_5=8$ | $s_5=0.3$. |

[1] =Out of specifications.

The computer now provides the following results:

$$\mu_g = 14.4$$
$$s_g = 1.12$$
$$L_U = 17.76$$
$$L_L = 11.04$$

Now the measured lower limit is less than the management limit of $L_L=11.127$ and, in addition, the measured upper limit is greater than the management limit of $L_U=17.673$. Either of these discrepancies is enough to disqualify the set of lots. This set of lots cannot be bonded.

As a final example, suppose the components were the same as those illustrated in Table IV except for the part P3. Assume here that its mean value $\mu_3$ is out of specification and is equal to 4. For this set of lots, the computer will calculate the following values:

$$\mu_g = 10.09$$
$$s_g = .908$$
$$L_U = 12.81$$
$$L_L = 7.37$$

Now, the upper limit is within specifications but the lower limit is not. This set of lots therefore cannot be bonded. It should be clear from this example that what must be done is to substitute for the part P3 a part P3 which is within specifications, insofar as its central tendency $\mu_3$ is concerned.

What is claimed is:

1. A method of manufacturing products comprising the steps of:
   specifying the values and their distribution of parameters of interest of lots of elements to be used in the manufacture of the products;
   sampling the lots of elements to be employed in manufacturing the products, some of which lots may be within specifications and some of which may be outside of specifications, and determining from these samples the actual values and their statistical distribution of parameters of interest of each lot;
   determining from these measured values, the values and their distribution, of performance parameters that the products manufactured from the sampled lots of elements will exhibit; and
   comparing these performance parameters with previously established performance limits and, (a) if the former are within the latter, regardless of whether or not a lot is outside of specifications, manufacturing the products from said lots of elements, (b) if the performance parameters are outside of said previous established limits, substituting for at least one of the lots of components, not necessarily a lot outside of said limits, a lot which will make the performance parameters of the products fall within said previously established limits, and then manufacturing the products from the lots of components.

2. The method of claim 1 and further including the step of:
   testing the performance of the manufactured products using test limits based upon the performance parameters determined from the measured values and their distribution of the parameters of interest of said lots of elements.

3. A method of manufacturing products comprising the steps of:
   specifying the mean value $\mu_s$, the standard deviation $s_s$, and the shape of the distribution curve of parameters of interest of lots of elements to be used in the manufacture of the products;
   sampling the lots of elements to be employed in manufacturing the products, some of which lots may be within specifications and some of which may be outside of specifications, and determining from these samples the actual values $\mu_m$, $s_m$ of the parameters of interest of each lot;
   for each parameter of interest of each lot of elements, if $\mu_m < (\mu_s - s_s)$ or if $\mu_m > (\mu_s + s_s)$, rejecting that lot of elements, and if $s_m > s_s$, rejecting that lot of elements, and if more than a given number of the elements of a lot have a measured value of a parameter greater than the value of that parameter at $4s_s$, rejecting that lot of elements;
   substituting for each rejected lot of elements if any, a new lot which has parameters of interest such that $(\mu_s - s_s) < \mu_m < (\mu_s + s_s)$, $s_m < s_s$, and less than a given number of the elements of each lot have a measured value of a parameter less than the value of that parameter at $4s_s$;
   determining from the measured values of parameters of the acceptable lots of elements, some of which may be outside of specifications, the values and their distribution of performance parameters the products manufactured from the acceptable lots of elements will have; and
   comparing these performance parameters with previously established performance limits and, (a) if the former are within the latter, regardless of whether one or more of the lots is outside of specifications, manufacturing the products from said lots of elements, (b) if the performance parameters are outside of said previous established limits, substituting for at least one of the lots of components, a lot which will make the performance parameters of the products fall within said previously established limits, and then manufacturing the products from the lots of components.

4. A method of manufacturing products comprising the steps of:
   specifying the values and their distribution of parameters of interest of lots of elements to be used in the manufacture of the products, which values and their distribution will enable the products to be within a predetermined marketing standard;
   sampling the lots of elements to be employed in manufacturing the products, some of which lots may be within specifications and some of which may be outside of specifications, and determining from these samples the actual values and their statistical distribution of parameters of interest of each lot;
   determining from these measured values and their statistical distribution, the test limits to be employed in testing the performance of the products manufactured from the sampled lots of elements, said test limits normally not being identical with said marketing standard but not falling outside of said marketing standard;
   manufacturing the products from said lots of elements; and
   testing the performance of the manufactured products using said test limits, a departure from said test limits being indicative of possible deterioration in the manufacturing process.

5. A method of manufacturing products in which elements are first fabricated into subassemblies and the subassemblies are then interconnected to form the final products comprising the steps of:
   specifying the values and their distribution of parameters of interest of lots of elements to be used in the manufacture of the products, which values and their distribution will enable the products to be within a predetermined marketing standard;

sampling the lots of elements to be employed in manufacturing the products, some of which lots are within specifications and some of which are outside of specifications, and determining from these samples the actual values and their statistical distribution of parameters of interest of each lot;

manufacturing subassemblies from the lots of elements and the final products from the subassemblies; and testing the performance of the subassemblies and final products using test limits calculated from the actual values and their distribution of the parameters of interest of said lots of elements, said test limits normally not being identical with said marking standard but not falling outside of said marketing standard, a departure from said test limits being indicative of possible deterioration in the manufacturing process.

6. A method of manufacturing products in which elements are first fabricated into subassemblies and the subassemblies are then interconnected to form the final products comprising the steps of:

specifying the values and their distribution of parameters of interest of lots of elements to be used in the manufacture of the products;

sampling the lots of elements to be employed in manufacturing the products, some of which lots are within specifications and some of which are outside of specifications, and determining from these samples the actual values and their statistical distribution of parameters of interest of each lot;

calculating from the actual values and their statistical distribution of parameters of interest of each lot, the number of final products manufactured from said lots which will be acceptable and, if said number is lower than a given value, replacing the one or more of the lots of elements responsible for the relatively low number of acceptable final products;

manufacturing subassemblies and final products from the lots of elements; and testing the performance of these subassemblies and final products using test limits calculated from the actual values and their distribution of the parameters of interest of said lots of elements.

References Cited

Lapp Insulators for 1928, Catalog #4, March 1928.

RUDOLPH V. ROLINEC, Primary Examiner

E. L. STOLARUN, Assistant Examiner

U.S. Cl. X.R.

324—73